Feb. 12, 1957  O. F. WENDT  2,780,820
SEWER PIPE CLEANING ATTACHMENT
Filed Aug. 14, 1953  2 Sheets-Sheet 1

INVENTOR.
Otto Fred Wendt
BY Victor J. Evans & Co.
ATTORNEYS

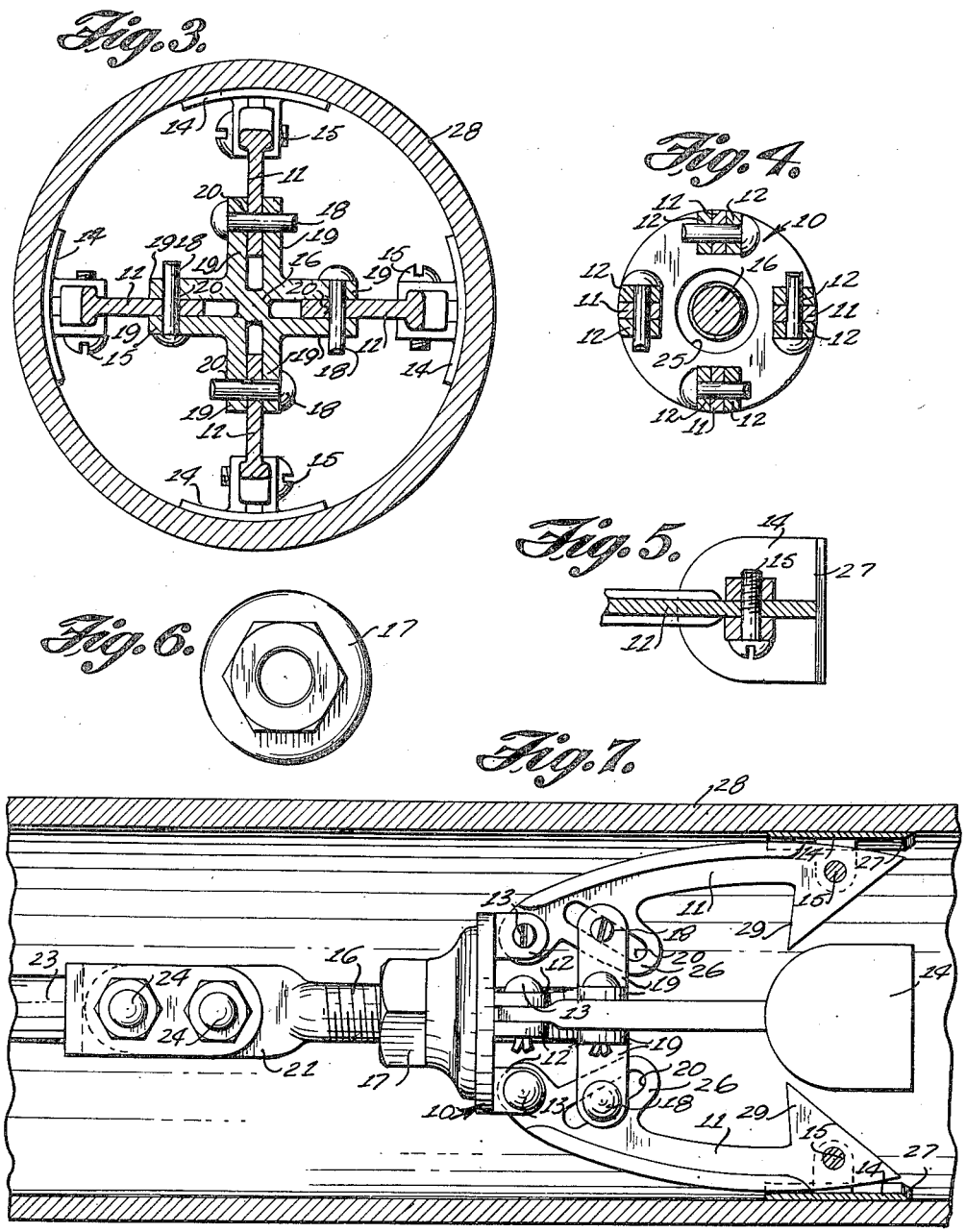

United States Patent Office 2,780,820
Patented Feb. 12, 1957

2,780,820

SEWER PIPE CLEANING ATTACHMENT

Otto Fred Wendt, Fargo, N. Dak.

Application August 14, 1953, Serial No. 374,268

2 Claims. (Cl. 15—104.3)

This invention relates to devices, generally referred to as snakes, which are moved by flexible cables through sewer pipes, drain pipes, and similar types of tubing, and in particular a head having a plurality of hinged gripping jaws connected to the end of the flexible cable and adapted to be urged forwardly through a pipe for cutting roots and removing accumulations in the pipe or on the sides thereof and which is also provided with gripping prongs that are adapted to take hold of objects, such as a root and withdraw the roots from the pipe as the head is withdrawn.

The purpose of this invention is to provide an extensible head adapted to be carried on the end of a flexible cable for traveling through sewer pipes and the like for cleaning the pipes.

Various types of boring tools and cleaning elements have been provided on ends of flexible cables, rods, and the like for removing accumulations in pipe and tubing however, although such devices are successful for removing scale from boiler tubes and ordinary accumulations it is difficult, if not impossible, to cut roots and other relatively thick obstructions in sewer and drain pipes. Furthermore with conventional types of devices for this use it is difficult to automatically grip a root or other solid matter for withdrawing the root or the like from the tube, or pipe.

With this thought in mind this invention contemplates plurality of radially disposed jaws pivotally mounted on a movable head whereby the jaws are adjustable to correspond with the inside diameter of a tube or pipe and wherein the jaws are adapted to be automatically operated, when withdrawn, to grip a solid element or the like.

The object of this invention is, therefore, to provide a cleaning head for tubes, pipes and the like having a plurality of jaws adapted to be automatically adjusted to compensate for inside diameters of tubes and pipes and wherein the jaws are adapted to collapse to grip objects and the like when drawn in the opposite direction.

Another object of the invention is to provide a head for a cleaning tool for pipes, tubes, and the like, in which the head is adapted to cut roots and other fixed obstructions.

A further object of the invention is to provide a head having a plurality of radially disposed jaws pivotally mounted thereon for removing and withdrawing matter from inner surfaces of pipes, tubes and the like in which the device is of a simple and economical construction.

With these and other objects and advantages in view the invention embodies a head slidably mounted on a threaded shank with radially disposed jaws having scraping pads pivotally mounted on extended ends pivotally mounted on the head and having slots positioned to receive pins of a spider on the end of the threaded shank and a nut threaded on the shank and positioned to engage the head to adjust the relative positions of the jaws.

Other features and advantages of the invention will appear from the following description taken in connection with the drawings, wherein:

Figure 3 is a cross section through the device taken on line 3—3 of Fig. 1 showing the relative positions of the jaws and cleaning pads or plates.

Figure 4 is a sectional view through the pivotal connections of the jaws on the head with other parts omitted.

Figure 5 is a detail showing a section through the pivotal connection of one of the cleaning pads or plates to one of the jaws.

Figure 6 is a detail showning an end elevational view of an adjusting nut threaded on the shank extended through the head of the device.

Figure 7 is a longitudinal section similar to that shown in Fig. 1 showing the cleaning jaws contracted to correspond with a small pipe.

Figure 1:
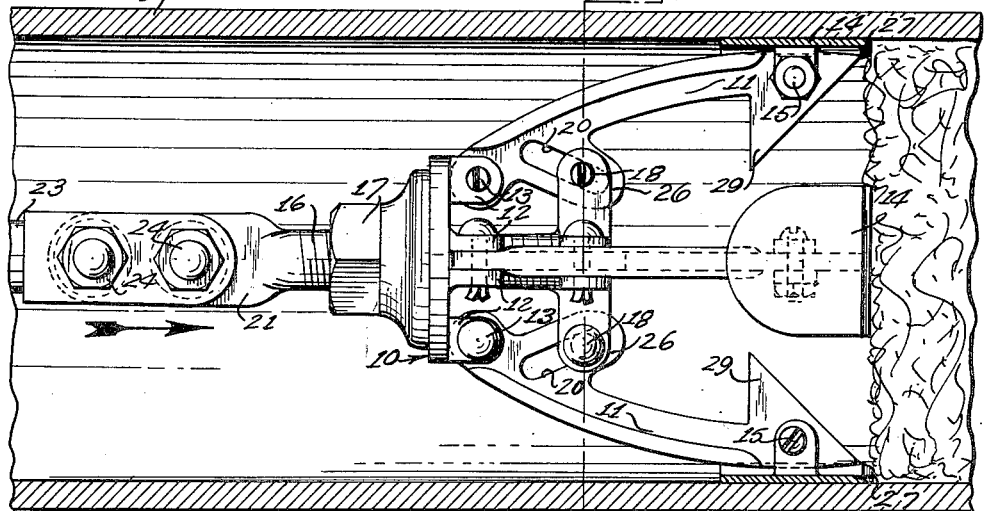
Figure 1 is a side elevational view of the attachment showing the device positioned in a pipe, the pipe being shown in section.

Referring now to the drawings wherein like reference characters denote corresponding parts the improved sewer and drain pipe cleaning attachment of this invention includes a head 10, jaws 11 pivotally mounted between ears 12 extended from the head, with pins 13, scraper plates or shoes 14 pivotally mounted on the jaws with pins 15, a threaded shank 16 having an adjusting nut 17 thereon, pins 18 mounted in flanges 19 extended from the shank 16 and positioned in angularly disposed slots 20 of the jaws and a tongue 21 by which the device is mounted in a socket 22 of a flexible shaft 23 with bolts 24.

Figure 2:
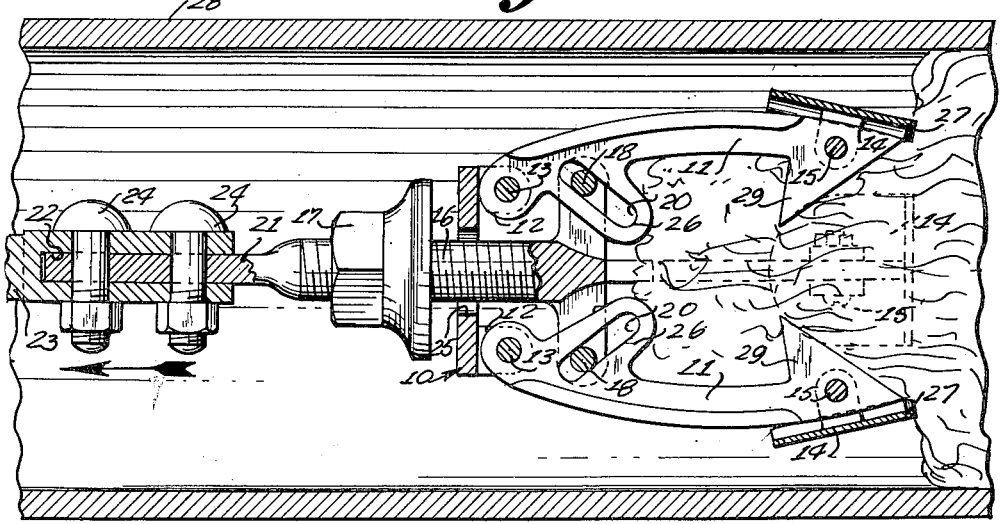
Figure 2 is a sectional plan through the device shown in Fig. 1 with parts shown in elevation and with the gripping jaws contracted.

The head 10, which is in the form of a disc is provided with an opening 25, through which the threaded shank 16 extends, as shown in Fig. 2 and with the jaws 11, which are in the form of arcuate arms, pivotally mounted in the ears 12 with the pins 13 and actuated by the pins 18 extended through the angularly disposed slots 20 in the extensions 26 of the jaws, the positions of the jaws are adjustable and the outside diameter described by the shoes 14 is adjustable by the nut 17 which is positioned to engage the head 10.

The ends of the shoes or plates 14 are beveled providing sharp cutting edges 27 that are adapted to cut roots, or other fixed obstructions extending into or through the sewer or drain pipe, which is indicated by the numeral 28.

The inner surfaces of the jaws 11 are provided with gripping prongs 29 whereby after cutting roots and the like with the sharp edges of the shoes the roots, and other solid matter, may be gripped by the prongs, as illustrated in Fig. 2 so that they may be withdrawn by drawing the head backward through the pipe or tube.

In operation the sewer and drain pipe cleaner or refuse removing tool of this invention is mounted on the end of a flexible cable and rotated as it is moved forwardly by the cable whereby, with the shoes 14 set to contact the inner surface of the pipe or tube all matter accumulated against the inner surface of a pipe or tube or other obstructions such as roots penetrating the pipe or tube will be cut by the shoes.

With the parts positioned as disclosed and described the head operates automatically in that the jaws widen out as a result of a forward pressure pushing the device forwardly through the pipe and upon cutting obstructions such as roots and the like the jaws automatically move together gripping such obstructions as the head is pulled in the opposite direction. The device, therefore, opens and contracts automatically and the positions of the parts are, therefore, automatically set without withdrawing the head from the pipe or tube.

It will be understood that modifications, within the scope of the appended claims, may be made in the design and arrangement of the parts without departing from the spirit of the invention.

What is claimed is:

1. A pipe cleaner comprising a head, arcuate jaws having inwardly extended gripping prongs on the inner surfaces of extended ends pivotally mounted on the head, shoes having sharp forward edges pivotally mounted on the jaws, a threaded shank extended loosely through the head and having flanges extended therefrom, said jaws having extensions thereon that are angularly disposed with relation to the longitudinal axis of the shank, said extensions having angularly disposed slots therein, pins extended through the flanges of the threaded shank and through the angularly disposed slots of the jaws, extensions on the jaws for expanding and contracting the jaws through axial movement of said shank in relation to said head, a nut threaded on the shank to limit the axial movement of said shank and means for connecting the shank to an operating device.

2. In a pipe cleaner, the combination which comprises a head having radially disposed ears extended from one face, arcuate jaws pivotally mounted between the ears of the head, shoes having cutting leading edges pivotally mounted on the jaws, said jaws having extensions thereon that are angularly disposed with relation to the radially disposed ears on the head, said extensions having similar angularly disposed slots therein and gripping prongs extended from the inner edges thereof, a threaded shank having flanges extended from the end thereof extended through the head and having means on the opposite end for connecting the device to a flexible shaft and a nut threaded on said threaded shank for adjusting the position of the flanges at the end of the shank in relation to the head, and pins extended through the flanges of the shank and the angularly disposed slots in the extensions on the jaws for expanding and contracting the jaws as the threaded shank is adjusted in relation to the head.

References Cited in the file of this patent

UNITED STATES PATENTS

| | | |
|---|---|---|
| 518,638 | Weston | Apr. 24, 1894 |
| 728,085 | Curzan | May 12, 1903 |
| 1,377,933 | Sheatsley | May 10, 1921 |
| 1,568,392 | Abernathy | Jan. 5, 1926 |
| 1,745,804 | Martinez | Feb. 4, 1930 |
| 2,038,170 | Flavin | Apr. 21, 1936 |
| 2,173,606 | Forster | Sept. 19, 1939 |